(12) United States Patent
Kehimkar et al.

(10) Patent No.: US 9,783,021 B2
(45) Date of Patent: Oct. 10, 2017

(54) INTEGRATED HVAC CASE AND PIPE RETENTION FEATURE

(71) Applicant: DENSO International America, Inc., Southfield, MI (US)

(72) Inventors: Simon Kehimkar, Detroit, MI (US); Thomas Peard, Birmingham, MI (US)

(73) Assignee: Denso International America, Inc., Southfield, MI (US)

( * ) Notice: Subject to any disclaimer, the term of this patent is extended or adjusted under 35 U.S.C. 154(b) by 1234 days.

(21) Appl. No.: 13/724,074

(22) Filed: Dec. 21, 2012

(65) Prior Publication Data

US 2014/0174582 A1 Jun. 26, 2014

(51) Int. Cl.
*F16L 3/00* (2006.01)
*B60H 1/00* (2006.01)

(52) U.S. Cl.
CPC ..... *B60H 1/00542* (2013.01); *B60H 1/00528* (2013.01); *B60H 1/00571* (2013.01)

(58) Field of Classification Search
CPC ............ B60H 1/00678; B60H 1/00857; B60H 1/00564; B60H 1/00528; B60H 1/00542; B60H 1/00571; B60H 1/0065
USPC .......................................... 454/69, 148, 161
See application file for complete search history.

(56) References Cited

U.S. PATENT DOCUMENTS

| | | | |
|---|---|---|---|
| 4,260,123 A | 4/1981 | Ismert | |
| 5,303,887 A | 4/1994 | Hasty et al. | |
| 5,385,320 A | 1/1995 | Ismert et al. | |
| 5,876,000 A | 3/1999 | Ismert | |
| 6,126,122 A | 10/2000 | Ismert | |
| 6,273,145 B1 | 8/2001 | Botting | |
| 6,595,471 B1 | 7/2003 | Botting | |
| 6,719,247 B1 | 4/2004 | Botting | |
| 7,036,333 B2 * | 5/2006 | Schurig | B60H 1/3233 454/147 |
| 7,039,965 B1 | 5/2006 | Ismert | |
| 7,100,675 B2 * | 9/2006 | Yamamoto | B60H 1/00028 165/42 |
| 7,197,777 B2 | 4/2007 | Ismert et al. | |
| 7,207,530 B2 | 4/2007 | Ismert et al. | |
| D558,567 S | 1/2008 | Ismert et al. | |
| 7,549,613 B1 | 6/2009 | Ismert et al. | |
| 7,942,192 B2 | 5/2011 | Yamamoto et al. | |
| 8,141,831 B2 | 3/2012 | Julian et al. | |
| 8,220,583 B2 | 7/2012 | Botting | |
| 2003/0010474 A1 * | 1/2003 | Araki | B62D 25/14 165/42 |
| 2006/0144583 A1 * | 7/2006 | Araki | B60H 1/00028 165/204 |
| 2011/0005708 A1 * | 1/2011 | Seto | B60H 1/00064 165/41 |
| 2011/0103882 A1 * | 5/2011 | McDavid | B60H 1/00571 403/14 |

* cited by examiner

*Primary Examiner* — Gregory Huson
*Assistant Examiner* — Dana Tighe
(74) *Attorney, Agent, or Firm* — Harness, Dickey & Pierce, P.L.C.

(57) ABSTRACT

A heating, ventilation, and air cooling (HVAC) assembly including a blower subassembly and an HVAC subassembly. The blower subassembly includes a first heater core pipe retention member. The HVAC subassembly includes a second heater core pipe retention member. The first and the second heater core pipe retention members are configured to secure at least one heater core pipe therebetween.

15 Claims, 5 Drawing Sheets

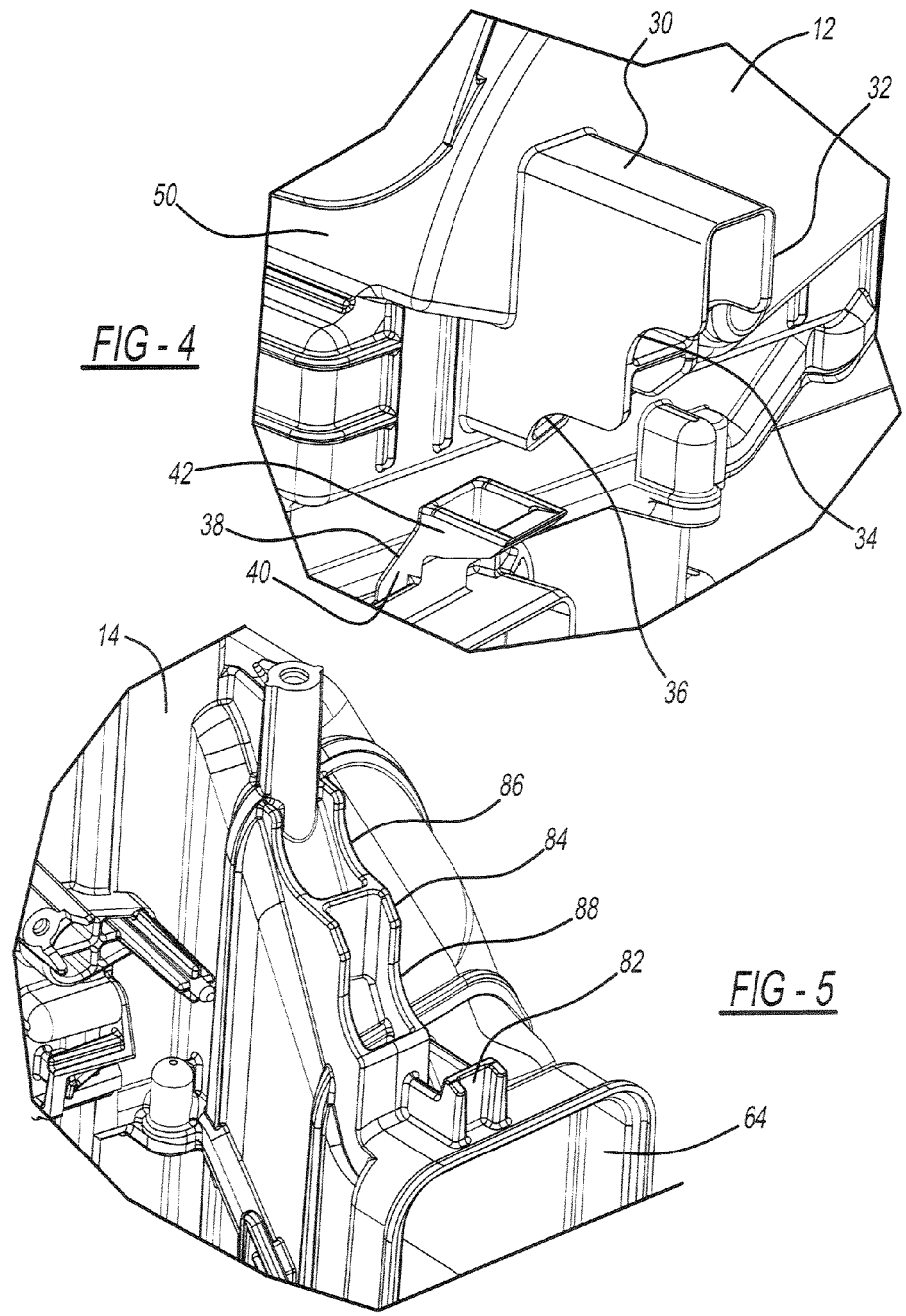

INTEGRATED HVAC CASE AND PIPE RETENTION FEATURE

FIELD

The present disclosure relates to heating, ventilation, and air cooling (HVAC) assemblies, and particularly to an integrated HVAC case and pipe retention feature for an HVAC assembly.

BACKGROUND

This section provides background information related to the present disclosure, which is not necessarily prior art.

Vehicle heating, ventilation, and air cooling (HVAC) assemblies often include a blower assembly connected to an HVAC subassembly, which houses an evaporator and a heater core. An inlet pipe and an outlet pipe extend from the heater core. The inlet and outlet pipes are coupled to an exterior of the HVAC subassembly with a separate bracket, which can increase the complexity and cost of the HVAC assembly. Damaged or improperly secured brackets can result in undesirable vibrations and rattling of the heater core pipes.

SUMMARY

This section provides a general summary of the disclosure, and is not a comprehensive disclosure of its full scope or all of its features.

The present teachings provide for a heating, ventilation, and air cooling (HVAC) assembly including a blower subassembly and an HVAC subassembly. The blower subassembly includes a first heater core pipe retention member. The HVAC subassembly includes a second heater core pipe retention member. The first and the second heater core pipe retention members are configured to secure at least one heater core pipe therebetween.

The present teachings also provide for a heating, ventilation, and air cooling (HVAC) assembly including a blower subassembly, an HVAC subassembly, a heater core, a first retention member, and a second retention member. The HVAC subassembly is configured to couple with the blower subassembly. The heater core includes a first pipe and a second pipe extending therefrom. The first retention member is included with the blower subassembly. The second retention member is included with the HVAC subassembly. The first retention member and the second retention member are configured to secure the first pipe and the second pipe between the blower subassembly and the HVAC subassembly.

The present teachings further provide for a heating, ventilation, and air cooling (HVAC) assembly including a blower subassembly and an HVAC subassembly. The blower subassembly includes a first pipe retention member. The HVAC subassembly is coupled with the blower subassembly and includes an evaporator, a second pipe retention member opposite to the first pipe retention member, and a heater core with an inlet pipe and an outlet pipe extending therefrom. The first pipe retention member and the second pipe retention member together define a first aperture configured to receive the inlet pipe and a second aperture configured to receive the outlet pipe.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a perspective view of a first pipe retention member of the HVAC assembly of FIG. 1;

FIG. 5 is a perspective view of a second pipe retention member of the HVAC assembly of FIG. 1.

Corresponding reference numerals indicate corresponding parts throughout the several views of the drawings.

DETAILED DESCRIPTION

Example embodiments will now be described more fully with reference to the accompanying drawings.

Figure 1:
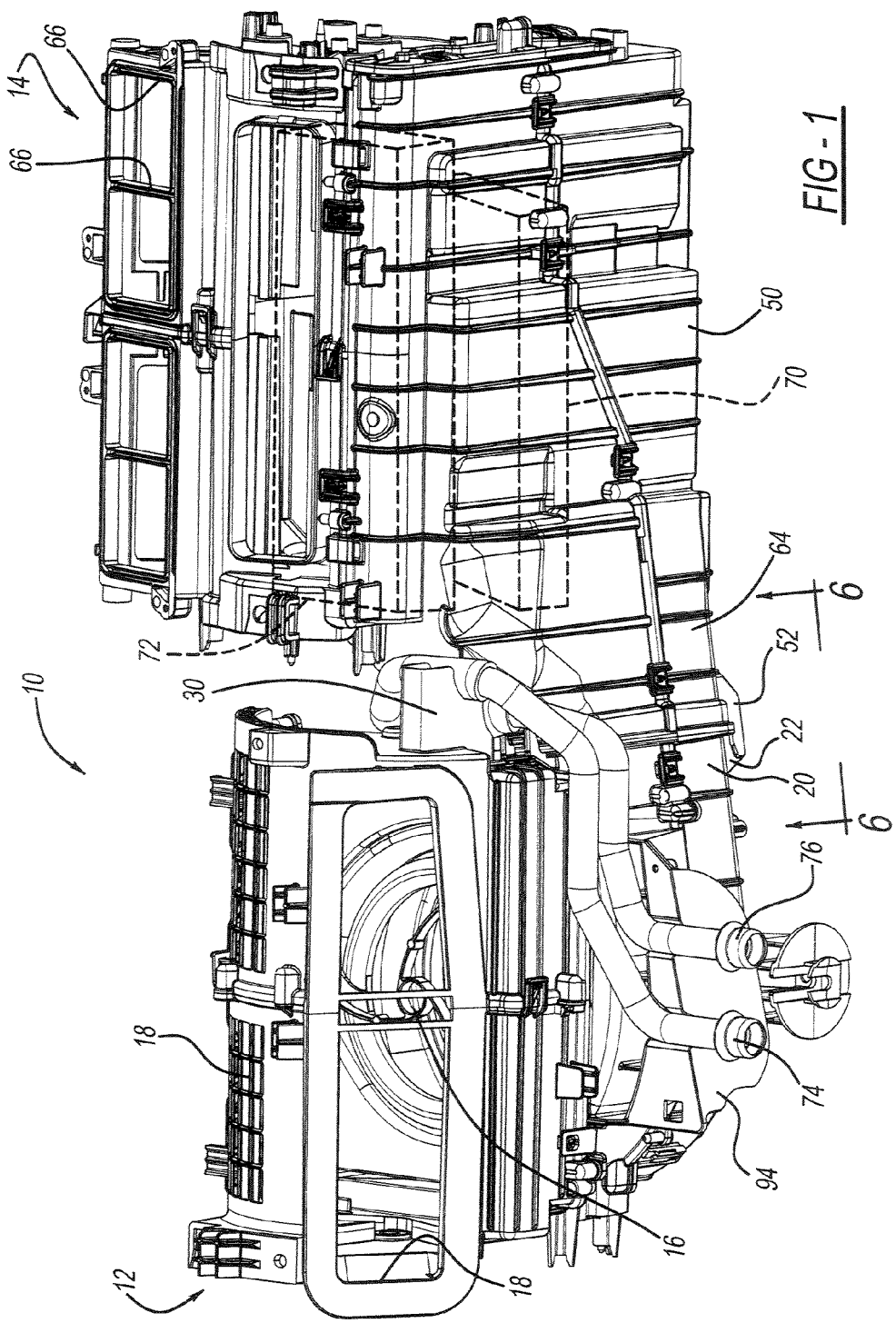
FIG. 1 is a perspective view of a heating, ventilation, and air cooling (HVAC) assembly according to the present teachings including a blower subassembly coupled to an HVAC subassembly.
Figure 2:
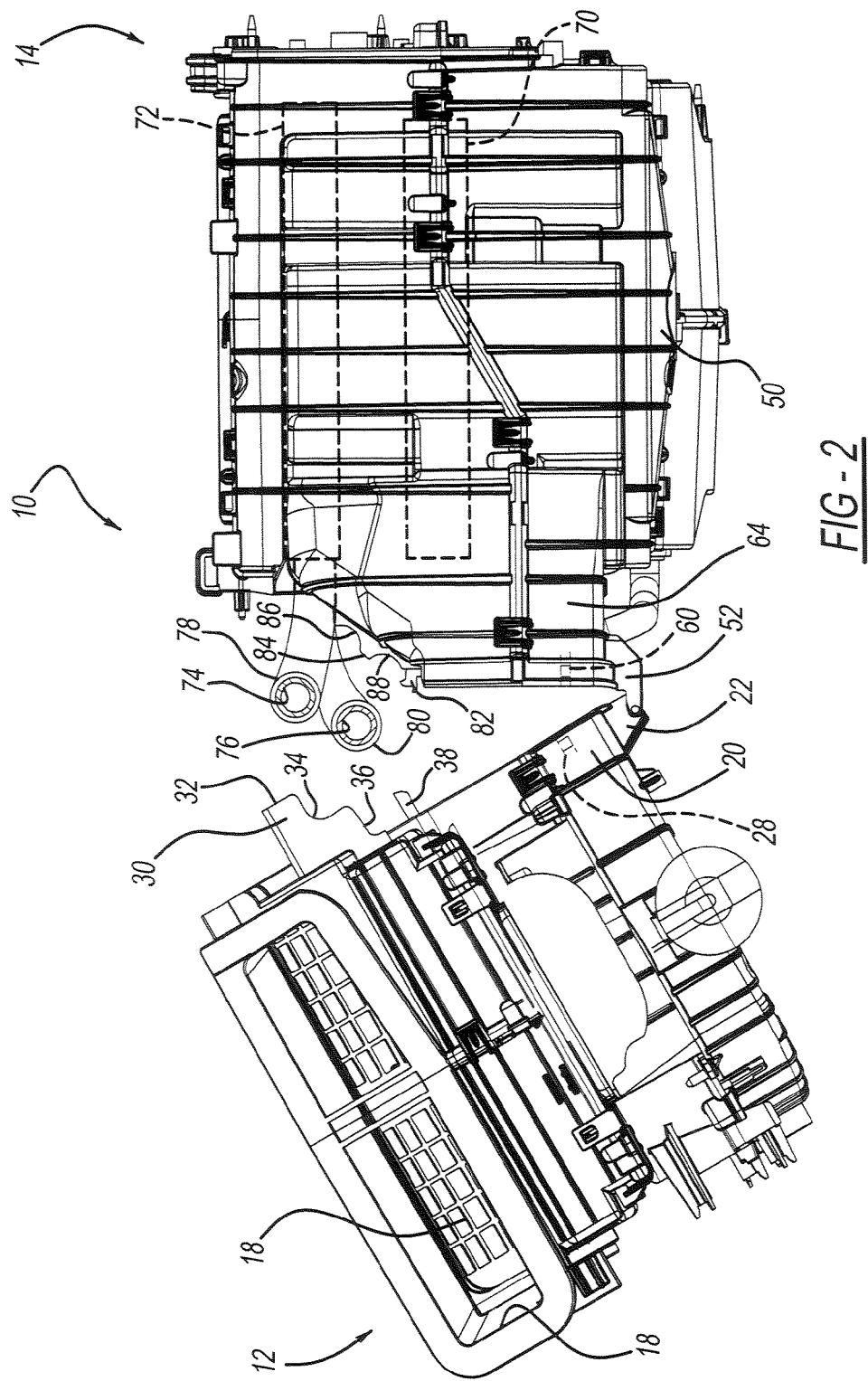
FIG. 2 is a side view of the HVAC assembly of FIG. 1, the blower subassembly and the HVAC subassembly partially decoupled from one another.

A heating, ventilation, and air cooling (HVAC) assembly according to the present teachings is generally illustrated in FIGS. 1 and 2 at reference numeral 10. Although the HVAC assembly 10 is illustrated and described herein as a vehicle HVAC assembly, the HVAC assembly 10 can be used at any suitable location and with any suitable device. For example, the HVAC assembly 10 can also be used in a building.

The HVAC assembly 10 generally includes a blower subassembly 12 and an HVAC subassembly 14. The blower subassembly 12 includes a blower 16 mounted therein. The blower 16 is configured to draw air into the blower subassembly 12 through air intake openings 18. The blower 16 pushes air drawn in through the air intake openings 18 to the HVAC subassembly 14 through a first duct portion 20.

Figure 3:
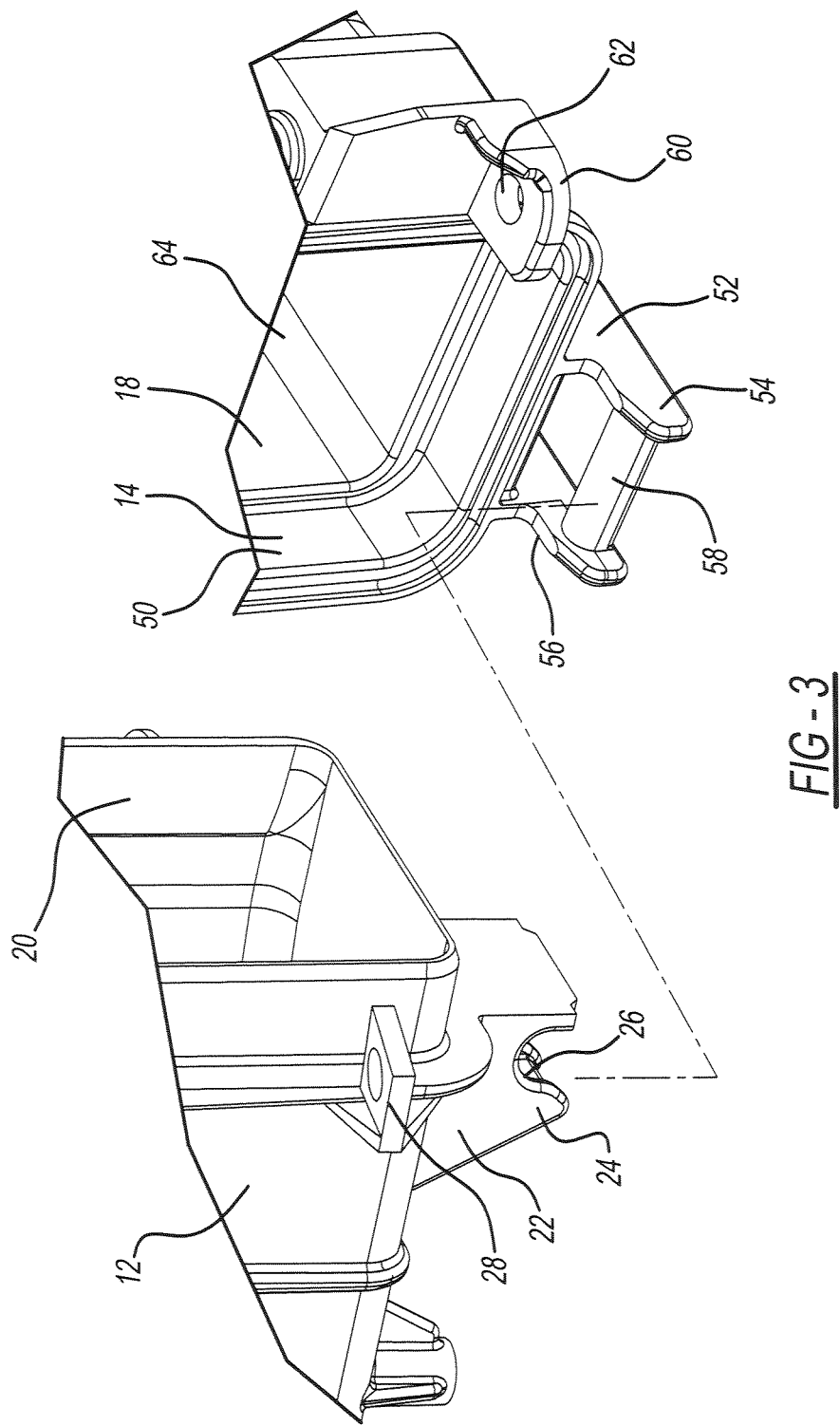
FIG. 3 is a perspective view of a first coupling member of the blower subassembly decoupled from a second coupling member of the HVAC subassembly.

With continued reference to FIGS. 1 and 2 and additional reference to FIG. 3, the blower subassembly 12 further includes a first coupling member 22 proximate to the first duct portion 20 at an undersurface of the blower subassembly 12. The first coupling member 22 includes a hook portion 24, which defines a receptacle 26. The first coupling member 22 is configured to couple with the HVAC subassembly 14 in a pivotable manner, as further described herein. The blower subassembly 12 further includes a flange 28 (FIG. 3) extending from an exterior surface thereof. The flange 28 is configured to be potentially coupled to a corresponding flange of the HVAC subassembly 14 using a fastener, as further explained herein, in order to further secure the blower subassembly 12 and the HVAC subassembly 14 together. In place of, or in addition to, the flange 28, any suitable connection or coupling can be used. For example, screw bosses can be provided on the blower subassembly 12 and the HVAC subassembly 14 and arranged such that they are aligned with each other when the blower subassembly 12 is coupled to the HVAC subassembly 14.

With additional reference to FIG. 4, the blower subassembly 12 further includes a first heater core pipe retention member 30. The first heater core pipe retention member 30 includes a retention flange 32 extending from an exterior surface of the blower subassembly 12. The retention flange 32 includes a first step portion, which defines a first recess 34. The retention flange 32 further includes a second step portion, which defines a second recess 36. As further explained herein, the first and second recesses 34 and 36 retain heater core pipes between the blower subassembly 12 and the HVAC subassembly 14.

The blower subassembly 12 further includes, as illustrated in FIG. 4 for example, a coupling clip 38. The clip 38 generally includes a vertical flange 40 extending from an exterior surface of the blower subassembly 12. Extending from the vertical flange 40 is a horizontal flange 42. The clip 38 is configured to couple with the HVAC subassembly 14 to lock the blower subassembly 12 to the HVAC subassembly 14, as further described herein.

With respect to the HVAC subassembly 14, it includes an HVAC subassembly case 50. As illustrated in FIG. 3 for example, the HVAC subassembly case 50 includes a second coupling member 52 that is configured to couple with the first coupling member 22 of the blower subassembly 12. The second coupling member 52 includes a first flange 54 and a second flange 56. The first and second flanges 54 and 56 extend from the HVAC subassembly case 50 at an undersurface thereof. A transverse portion 58, illustrated in FIG. 3 as a rod, extends between the first flange 54 and the second flange 56. The transverse portion 58 is sized and shaped for receipt within the receptacle 26 of the first coupling member 22. Cooperation between the first coupling member 22 and the second coupling member 52 connects the blower subassembly 12 and the HVAC subassembly 14 together, and provides a pivotable coupling therebetween as illustrated in FIG. 2 for example.

Extending from a side of the HVAC subassembly case 50 proximate to the second coupling member 52 is a fastener flange 60. The fastener flange 60 defines an aperture 62. The aperture 62 is sized and shaped to receive a suitable fastener. The fastener flange 60 aligns with the flange 28 of the blower subassembly 12 when the blower subassembly 12 is fully coupled to the HVAC subassembly 14, as illustrated in FIG. 1. Coupling the flanges 28 and 60 together with a suitable fastener locks the blower subassembly to the HVAC subassembly 14.

The HVAC subassembly case 50 defines a second duct portion 64 at a bottom portion thereof proximate to the second coupling member 52 and the fastener flange 60. When the blower subassembly 12 is fully coupled to the HVAC subassembly 14, as illustrated in FIG. 1, the second duct portion 64 aligns with the first duct portion 20 to permit airflow generated by the blower 16 to pass into the HVAC subassembly 14. Because the blower 16 draws air into the blower subassembly 12 through the air intake openings 18, the blower subassembly 12 operates to draw air from the environment surrounding the HVAC assembly 10 into the HVAC subassembly 14. For example, the blower 16 draws air external to a vehicle into the blower subassembly 12 and pushes the air both to and through the HVAC subassembly 14.

Airflow exits the HVAC subassembly 14 through air output openings 66 (FIG. 1) defined by the HVAC subassembly 14. Prior to exiting the HVAC subassembly case 50 through the air output openings 66, airflow passes through an evaporator 70 and a heater core 72 of the HVAC subassembly 14. The evaporator 70 and the heater core 72 are mounted within the HVAC subassembly case 50 in general alignment with one another and in the path of airflow flowing through the HVAC subassembly case 50. In a heating mode, the heater core 72 is activated and the evaporator 70 is not, thus resulting in relatively warm airflow exiting through the air output openings 66. In an air cooling mode, the evaporator 70 is activated and the heater core 72 is not, thus resulting in relatively cool airflow exiting through the air output openings 66.

Extending from the heater core 72 is a first heater core pipe 74 and a second heater core pipe 76. The first and second heater core pipes 74 and 76 extend out from within the HVAC subassembly case 50, and portions of the first and the second heater core pipes 74 and 76 extend through an area between the blower subassembly 12 and the HVAC subassembly 14. A portion of the first heater core pipe 74 between the blower subassembly 12 and the HVAC subassembly 14 may include a first sleeve 78 extending thereabout. Similarly, a portion of the second heater core pipe 76 arranged between the blower subassembly 12 and the HVAC subassembly 14 may include a second sleeve 80. The first and second sleeves 78 and 80 may serve to protect and insulate the first and the second heater core pipes 74 and 76 in the areas where they are coupled between the blower subassembly 12 and the HVAC subassembly 14, as further described herein. The first and the second sleeves 78 and 80 may be mounted to the first and the second heater core pipes 74 and 76 in any suitable manner, such as being molded thereto. The first and the second sleeves 78 and 80 are optional and need not be included.

The HVAC subassembly 14 further includes a clip flange 82, as illustrated in FIG. 5 for example. The clip flange 82 is proximate to the second duct portion 64 and is generally aligned with, and opposite to, the clip 38 of the blower subassembly 12. Therefore, when the blower subassembly 12 and the HVAC subassembly 14 are fully coupled together, as illustrated in FIGS. 1 and 6, the clip 38 may be included, which mates with the clip flange 82 such that the horizontal flange 42 of the clip 38 passes over and onto the clip flange 82 to secure the clip 38 onto the clip flange 82, thus locking the blower subassembly 12 and the HVAC subassembly 14 together.

The HVAC subassembly 14 further includes a second heater core pipe retention member 84, as illustrated in FIGS. 2 and 5 for example. The second heater core pipe retention member 84 is integral with, and defined by, the HVAC subassembly case 50. The second heater core pipe retention member 84 defines a first recess 86 and a second recess 88. Each of the first and second recesses 86 and 88 are shaped and sized in any manner suitable to receive a portion of the first heater core pipe 74 and the second heater core pipe 76 respectively, such as semi-circular shaped. The second heater core pipe retention member 84 can also be a modular member secured to the HVAC subassembly case 50 in any suitable manner.

Figure 6:
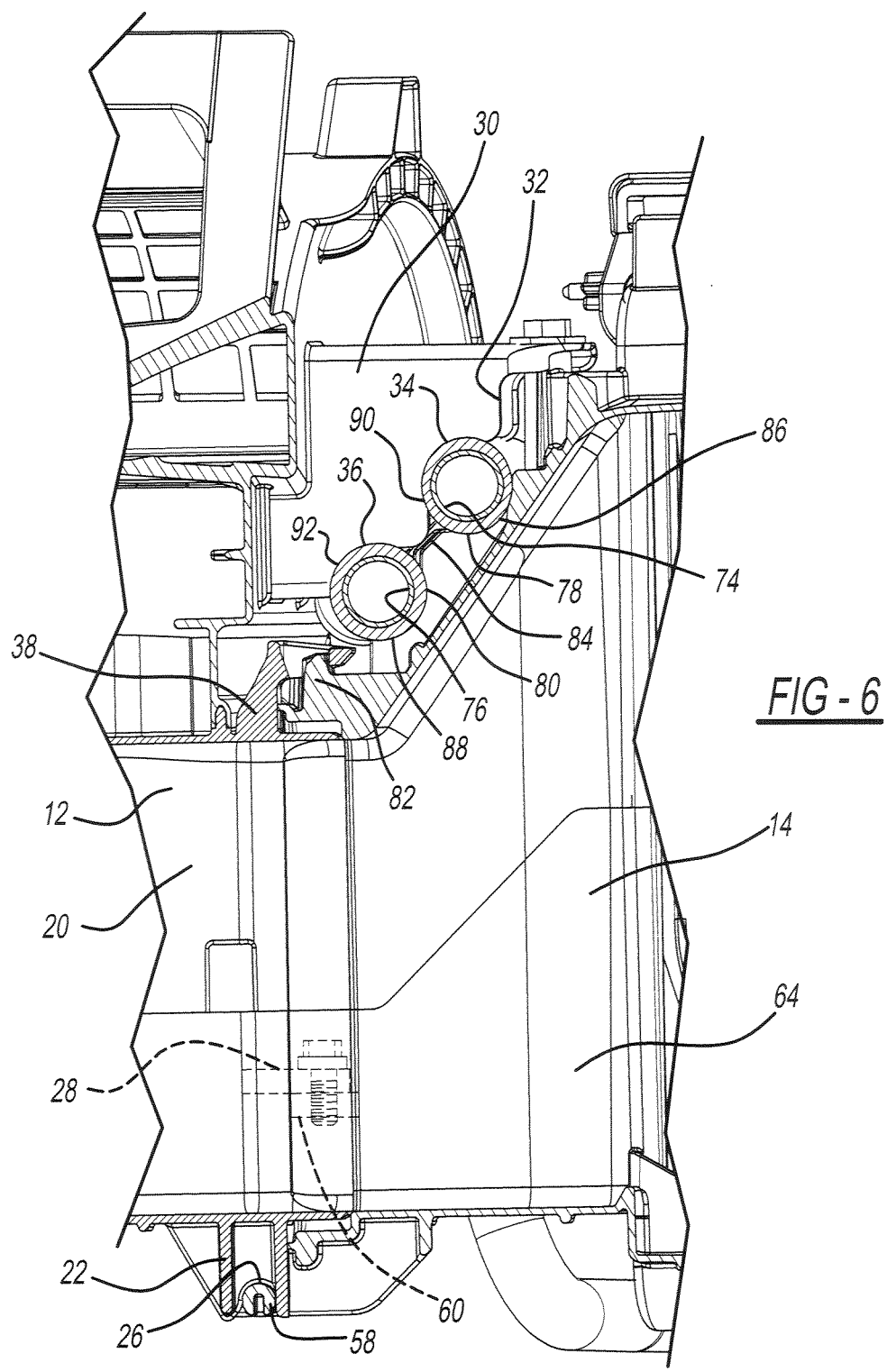
FIG. 6 illustrates the blower subassembly and the HVAC subassembly coupled together to secure a first heater core pipe and a second heater core pipe therebetween.

As illustrated in FIG. 6, when the blower subassembly 12 and the HVAC subassembly 14 are fully coupled together, the first recess 34 of the retention flange 32 and the first recess 86 of the second heater core pipe retention member 84 together define a first aperture 90. Similarly, the second recess 36 of the retention flange 32 and the second recess 88 of the second heater core pipe retention member 84 together define a second aperture 92. The first aperture 90 is sized and shaped to receive the first heater core pipe 74 therein.

Similarly, the second aperture 92 is sized and shaped to receive the second heater core pipe 76 therein. Distal ends of the first and the second heater core pipes 74 and 76 may be secured with a bracket 94 mounted to the blower subassembly 12, as illustrated in FIG. 1.

The first and the second heater core pipe retention members 30 and 84 thus together, when the blower subassembly 12 is fully coupled to the HVAC subassembly 14, secure portions of each of the first and the second heater core pipes 74 and 76 between the blower and HVAC subassemblies 12 and 14. The first and second pipe retention members 30 and 84 eliminate the need for a separate bracket mounted to either the blower subassembly 12 or the HVAC subassembly 14 to secure the first and second heater core pipes 74 and 76 between the blower and HVAC subassemblies 12 and 14. This configuration simplifies the HVAC assembly 10, as well as simplifies and reduces the cost of overall assembly. By securing the first and the second heater core pipes 74 and 76 in this manner, vibration and rattling of the pipes 74 and 76 can be greatly reduced or eliminated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A heating, ventilation, and air cooling (HVAC) assembly comprising:
   a blower subassembly including a first heater core pipe retention member; and
   an HVAC subassembly including a second heater core pipe retention member;
   wherein:
      the blower subassembly includes a first coupling member and the HVAC subassembly includes a second coupling member configured to pivotally couple with the first coupling member at a hinge point to pivotally couple the blower subassembly and the HVAC subassembly together;
      pivoting the blower subassembly and the HVAC subassembly together at the hinge point pivots the first heater core pipe retention member and the second heater core pipe retention member together; and
      the first and the second heater core pipe retention members are configured to secure at least one heater core pipe therebetween at a point distal to where the at least one heater core pipe exits the HVAC subassembly.

2. The HVAC assembly of claim 1, wherein the first heater core pipe retention member includes a flange extending from the blower subassembly.

3. The HVAC assembly of claim 2, wherein the flange defines a recess configured to partially receive the heater core pipe therein.

4. The HVAC assembly of claim 1, wherein the second heater core pipe retention member defines a recess configured to receive the heater core pipe therein.

5. The HVAC assembly of claim 1, wherein the HVAC subassembly includes a heater core with two heater core pipes extending therefrom.

6. A heating, ventilation, and air cooling (HVAC) assembly comprising:
   a blower subassembly;
   an HVAC subassembly configured to couple with the blower subassembly;
   a heater core with a first pipe and a second pipe extending therefrom;
   a first retention member included with the blower subassembly; and
   a second retention member included with the HVAC subassembly;
   wherein:
      the blower subassembly and the HVAC subassembly are pivotally coupled together at a hinge point;
      pivoting the blower subassembly and the HVAC subassembly together at the hinge point pivots the first retention member and the second retention member together;
      when pivotally moved together the first retention member and the second retention member define different portions of a first aperture to receive the first pipe and different portions of a second aperture to receive the second pipe; and
      the first retention member and the second retention member are configured to secure the first pipe and the second pipe between the blower subassembly and the HVAC subassembly at points distal to where the first pipe and the second pipe exit the HVAC subassembly.

7. The HVAC assembly of claim 6, further comprising a duct extending between the blower subassembly and the HVAC subassembly to direct airflow from the blower subassembly to the HVAC subassembly.

8. The HVAC assembly of claim 6, wherein the first retention member and the second retention member are configured to secure the first pipe and the second pipe therebetween.

9. The HVAC assembly of claim 8, wherein portions of the first pipe and the second pipe between the first and the second retention members include an external sleeve member.

10. The HVAC assembly of claim 6, wherein the first retention member is opposite to the second retention member when the blower subassembly and the HVAC subassembly are locked together.

11. A heating, ventilation, and air cooling (HVAC) assembly comprising:
    a blower subassembly including a first pipe retention member; and
    an HVAC subassembly configured to be coupled with the blower subassembly, the HVAC subassembly including an evaporator, a second pipe retention member opposite to the first pipe retention member, and a heater core with an inlet pipe and an outlet pipe extending therefrom;
    wherein the first pipe retention member and the second pipe retention member together define a first aperture configured to receive the inlet pipe and a second aperture configured to receive the outlet pipe; and
    the blower subassembly includes a retention clip configured to cooperate with a clip flange of the HVAC subassembly to lock the blower subassembly to the HVAC subassembly.

12. The HVAC assembly of claim 11, wherein the first pipe retention member includes a flange extending from the blower subassembly.

13. The HVAC assembly of claim 11, wherein the second pipe retention member defines a first recess that only partially receives the inlet pipe and a second recess that only partially receives the outlet pipe.

14. The HVAC assembly of claim 13, wherein the first pipe retention member includes a third recess opposite to the first recess to define the first aperture therebetween, and a fourth recess opposite to the second recess to define the second aperture therebetween.

15. The HVAC assembly of claim 11, wherein the HVAC assembly is a motor vehicle HVAC assembly.

* * * * *